United States Patent Office 2,953,553
Patented Sept. 20, 1960

2,953,553
CATALYTIC POLYMERIZATION

Philip M. Arnold, Bartlesville, Okla., assignor to Phillips Petroleum Company, a corporation of Delaware No Drawing. Filed Dec. 20, 1957, Ser. No. 704,016

13 Claims. (Cl. 260—91.1)

This invention relates to a method for catalytically polymerizing polymerizable organic monomers containing an ethylenic double bond. In one aspect, the invention relates to such a polymerization of such a monomer in the presence of a novel polymerization catalyst.

A variety of processes for the polymerization of materials through a double bond, such as the polymerization of olefins, are known in the art and are generally carried out in the presence of catalysts. However, the processes of prior art usually require high temperatures and pressures, thus rendering these processes expensive to operate on a commercial scale. One kind of polymerization reaction for olefins, which has been taught recently by the prior art, employs somewhat lower temperatures and pressures and is based upon the use of a catalyst consisting of an organometal compound, e.g., triethylaluminum, as a catalyst. However, the polymer that results from the latter processes is often a very low molecular weight polymer such as the dimer or trimer, etc., of ethylene when polymerizing ethylene, for instance, or somewhat higher polymers having molecular weights below 200. In many applications of the plastics and synthetic rubber industry, however, higher molecular weight polymers are required.

Therefore, it is an object of this invention to provide a catalytic polymerization method capable of producing relatively high molecular weight polymers economically at low temperatures and pressures.

Other objects, as well as aspects and advantages, of this invention will become apparent from a study of the accompanying disclosure.

According to the invention, there is provided a process for the polymerization of an organic compound containing an ethylenic double bond by contacting said polymerizable compound with an organic compound having one of the following nuclei

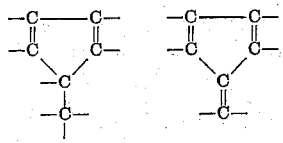

and containing at least 2 alkali metal atoms, each alkali metal atom bonded to a carbon of said compound, as catalyst for the polymerization. The compounds generally preferred contain only carbon, hydrogen, and said alkali metal. Compounds containing the nucleus having three conjugated double bonds are preferred.

The catalysts employed in the polymerization process of my invention are substituted fulvene compounds containing at least 2 atoms of an alkali metal, each bonded to a carbon atom.

Fulvene compounds containing at least two alkali metal atoms which are applicable in the process of my invention include the following:

(1) 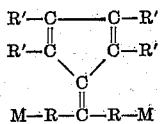

(2) 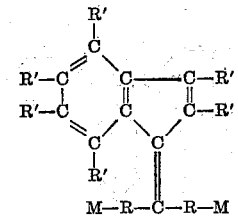

(3) 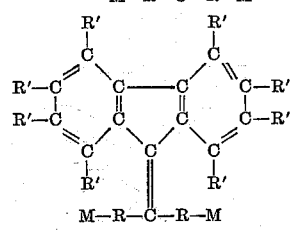

(4) 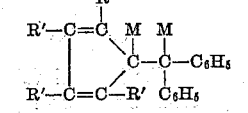

(5) 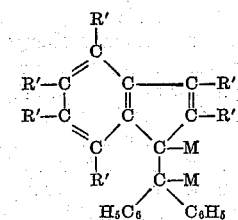

(6) 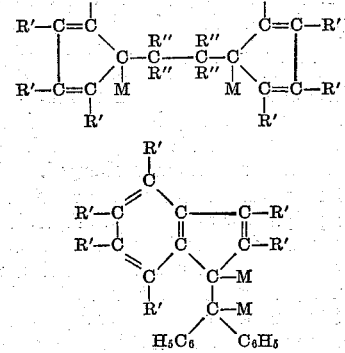

In the above formulas R is a divalent hydrocarbon radical such as an alkylen, cycloalkylene, or arylene radical; examples of such alkylene radicals are methylene, ethylene, propylene, amylene, and octylene radicals; examples of such cycloalkylene radicals include cyclohexylene, cyclopentylene, and methylcyclopentylene radicals; examples of such arylene radicals include phenylene and diphenylene radicals; R' is hydrogen, a hydrocarbon radical such as an alkyl, aryl, alkaryl, aralkyl, or cycloalkyl hydrocarbon radical, an alkli metal radical, or an alkali metal substituted hydrocarbon radical, MR, R an alkylene, cycloalkylene, or arylene radical set forth with respect to the above description of R, examples of such alkali metal substituted hydrocarbon radicals including sodium methyl and potassium ethyl, for instance; R" is a methyl or a hydrogen radical; and M is an alkali metal radical such as sodium, potassium, lithium or cesium. Each of R and R' contains a maximum of 10 carbon atoms. In the above formulas —$C_6H_5$ stands for phenyl.

Specific examples of the alkali metal containing fulvene compounds of this invention are as follows:

6,6-di(rubidiummethyl)fulvene
6,6-di(sodiummethyl)fulvene
2,3,6,6-tetra(sodiummethyl)fulvene
1,2-di(sodiummethyl)-6,6-di(αsodiummethyl)fulvene 8,8-di(potassiummethyl)benzofulvene
6,6-di(sodiummethyl)dibenzofulvene
6,6-di(lithiummethyl)-2,3-dipropylfulvene
6,6-di(potassiumphenyl)fulvene

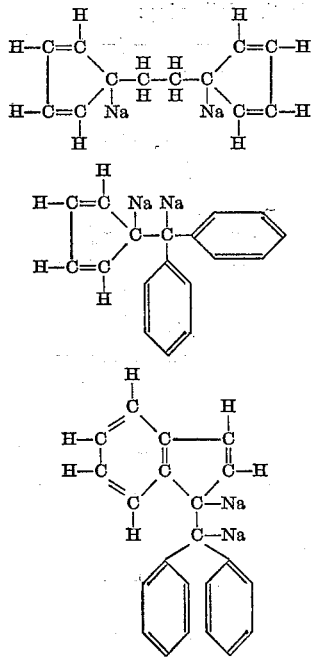

The amount of the alkali metal fulvene catalyst employed in the polymerization according to the invention can vary over a wide range. Relatively small amounts of catalyst provide the desired activating effect when the polymerization reaction is effected on a batch basis with continuous addition of the olefin as polymerization proceeds. The concentration of the alkali metal fulvene compound catalyst is usually in the range from 0.05 to 5 weight percent, more often in the range from 0.01 to 3 weight percent of the monomer charged.

The alkali metal fulvene compound catalyst can be used alone in the polymerization of the ethylenically unsaturated compounds or it can be used together with other activating compounds. Thus, the alkali metal fulvene compound catalysts can be used in conjunction with certain types of inorganic or organic compounds, preferably containing no more than 50 carbon atoms per molecule, of certain group IV, V, VI, or VIII metals, the groups being those in the periodic table shown in Mellor's Modern Inorganic Chemistry, 1939, page 118. A third component can also be added to the catalyst, viz., a halide of aluminum.

One class of certain group IV metal compounds that can be employed with the novel fulvene catalyst of my invention are the halides of titanium, zirconium, hafnium and thorium, or mixtures thereof. Specific examples of such compounds include titanium dichloride, titanium trichloride, titanium tetrachloride, titanium dibromide, titanium tribromide, titanium tetrabromide, titanium diiodide, titanium triiodide, titanium tetraiodide, titanium trifluoride, titanium tetrafluoride, zirconium dichloride, zirconium trichloride, zirconium tetrachloride, zirconium dibromide, zirconium tribromide, zirconium tetrabromide, zirconium tetraiodide, zirconium tetrafluoride, hafnium trichloride, hafnium tetrachloride, hafnium triiodide, hafnium tetraiodide, thorium dichloride, thorium trichloride, thorium tetrachloride, thorium dibromide, thorium tetrabromide, thorium diiodide, thorium tetraiodide, thorium difluoride, thorium tetrafluoride, etc.

Another class of group IV metal compounds that can be employed with the fulvene catalysts of the invention is the oxides and oxyhalides of metals of group IV selected from the group consisting of titanium, zirconium, tin, lead, hafnium, thorium, and germanium; as generally recognized silicon for purposes of this application is not a metal. Mixtures of such compounds can also be employed. Especially useful are one or more of the group titanium dioxide ($TiO_2$), zirconium dioxide ($ZrO_2$), hafnium dioxide ($HfO_2$), thorium dioxide ($ThO_2$), titanium oxychloride ($TiOCl_2$), zirconium oxychloride ($ZrOCl_2$), zirconium oxybromide ($ZrOBr_2$), zirconium oxyfluoride ($ZrOF_2$), thorium oxychloride ($ThOCl_2$), germanium oxychloride ($GeOCl_2$), and tin oxychloride ($SnOCl_2$). In addition, compounds such as $TiO$, $Ti_2O_3$, $ZrOI_2$, $HfOCl_2$, $SnO$, $SnO_2$, $GeO_2$, $PbO_2$, and $Pb_2OI_2$, as well as other lead, tin, and germanium oxides can be employed. The titanium dioxide can be used in the form of rutile, anatase, or brookite. These oxides and oxyhalides are preferably employed in the anhydrous or substantially anhydrous form.

Another class of metal compounds which can be employed in conjunction with the novel fulvene catalysts of the invention are the hydrides of titanium, zirconium, or germanium, or mixtures of such hydrides. Although any of the known or available hydrides coming within this definition are useful, I prefer to use those metal hydrides which are either liquid or solid at 20° C., and 1 atmosphere pressure. Included in this preferred group of metal hydrides are titanium hydride, $TiH_2$; zirconium hydride, $ZrH_2$; and the germanium hydrides $Ge_2H_6$ and $Ge_3H_8$.

Another class of compounds suitable as co-catalysts with the fulvene compound catalysts is composed of the halides, oxyhalides, hydroxyhalides, and oxyhydroxyhalides of any of the following group VI metals: molybdenum, tungsten, uranium, selenium, tellurium and polonium, where the term "halides" includes the chlorides, bromides, iodides, and fluorides. Also, complex salts of the aforementioned halides and oxyhalides with one of the group consisting of sodium, potassium, lithium, rubidium, cesium, and ammonium halides can also be employed. Mixtures of these halides, complex halides and complex salts can also be used. Specific examples of the numerous derivatives which fall within the scope of my invention are as follows:

molybdenum pentachloride,
molybdenum tetrachloride,
molybdenum tetraiodide,
molybdenum fluochloride,
molybdenum tetrachlorobromide,
tungsten hexachloride,
tungsten pentabromide,
tungsten diiodide,
uranium pentachloride,
uranium tetrafluoride,
uranium tetraiodide,
selenium tetrachloride,
tellurium tetrachloride,
molybdenum dioxydichloride ($MoO_2Cl_2$),
molybdenum trioxyhexachloride ($Mo_2O_3Cl_6$),
molybdenum pentoxyoctobromide ($Mo_3O_5Br_8$),
tungsten oxytetrachloride ($WOCl_4$),
tungsten dioxydifluoride ($WO_2F_2$),
uranium dioxydichloride ($UO_2Cl_2$),
uranium dioxydiiodide ($UO_2I_2$),
uranium dioxydibromide ($UO_2Br_2$),
selenium oxydifluoride ($SeOF_2$),
selenium oxydibromide ($SeOBr_2$),
tellurium oxydichloride ($TeOCl_2$),
tellurium oxydibromide ($TeOBr_2$),
polonium dioxychloride ($PoO_2Cl$),
molybdenum dihydroxytetrachloride ($Mo_3(OH)_2Cl_4$),
molybdenum hydroxytetrabromide ($Mo(OH)Br_4$),
molybdenum hydroxytetrachlorobromide
 ($Mo_3(OH)BrCl_4$),
molybdenum tetraoxyhydroxychloride ($Mo_2O_4(OH)Cl$),
molybdenum oxydihydroxydichloride ($MoO(OH)_2Cl_2$),
molybdenum oxyhydroxydibromide ($MoO(OH)Br_2$),
uranium dioxyhydroxychloride ($UO_2(OH)Cl$), ammonium molybdenum pentachloride (($NH_4$)$_2MoCl_5$),
potassium molybdenum hexachloride ($K_3MoCl_6$),
potassium molybdenum pentachloride ($K_2MoCl_5$),
rubidium molybdenum pentachloride ($Rb_2MoCl_5$),
ammonium molybdenum pentabromide (($NH_4$)$_2MoBr_5$),
sodium molybdenum hexabromide ($Na_2MoBr_6$),
potassium molybdenum tetrachlorotetraiodide
  ($K_2Mo_3Cl_4I_4$),
ammonium tungsten tetrafluoride ($NH_4WF_4$),
potassium tungsten tetrafluoride ($KWF_4$),
sodium uranous hexabromide ($Na_2UBr_6$),
potassium uranous hexabromide ($K_2UBr_6$),
ammonium hexabromoselenate (($NH_4$)$_2SeBr_6$),
rubidium hexabromoselenate ($Rb_2SeBr_6$),
cesium hexabromoselenate ($Cs_2SeBr_6$),
cesium pentafluotellurite ($CsTeF_5$),
ammonium pentafluotellurite ($NH_4TeF_5$),
potassium hexaiodotellurite ($K_2TeI_6$),
ammonium hexabromoselenate (($NH_4$)$_2SeBr_6$),
cesium hexabromoselenate ($Cs_2SeBr_6$),
ammonium polonium hexachloride (($NH_4$)$_3PoCl_6$),
ammonium molybdenum oxypentabromide
  (($NH_4$)$_2MoOBr_5$),
potassium molybdenum oxypentabromide ($K_2MoOBr_5$),
ammonium molybdenum oxypentachloride
  (($NH_4$)$_2MoOCl_5$),
cesium molybdenum dioxytetrachloride ($Cs_2MoO_2Cl_4$),
rubidium molybdenum dioxytrichloride ($RbMoO_2Cl_3$),
potassium trimolybdenum dioxyheptachloride
  ($KMo_3O_6Cl_7$),
cesium trimolybdenum dioxyheptachloride
  ($CsMo_3O_6Cl_7$),
ammonium tetrafluodioxytungstate (($NH_4$)$_2WO_2F_4$),
potassium oxypentachlorotungstite ($K_2WOCl_5$),
rubidium oxypentabromotungstite ($Rb_2WOBr_5$),
rubidium uranyl tetrachloride ($Rb_2UO_2Cl_4$),
ammonium uranyl tetrabromide (($NH_4$)$_2UO_2Br_4$),
ammonium chloropyroselenite ($NH_4Se_2O_4Cl$),
potassium bromopyroselenite ($KSe_2O_4Br$),
potassium difluotellurate ($K_2TeO_3F_2$),
and the like. The group VI metal derivatives which are preferably used in the catalyst composition of this invention are molybdenum pentachloride, molybdenum tetrachloride, potassium molybdenum hexachloride ($K_3MoCl_6$) and molybdenum oxydihydroxydichloride $$MoO(OH_2)Cl_2$$

The group VI metal derivatives listed hereinabove are preferably employed in the anhydrous or substantially anhydrous form.

Another particularly useful class of co-catalysts are the chromyl halides. It is to be understood that mixtures of any two or more of such compounds can be employed in the practice of the invention. The chromyl halides include chromyl chloride ($CrO_2Cl_2$), chromyl fluoride ($CrO_2F_2$), chromyl bromide ($CrO_2Br_2$) and chromyl iodide ($CrO_2I_2$). It is preferred to employ the compounds in the anhydrous or substantially anhydrous form.

Another class of compounds which can be employed as co-catalysts with my fulvene catalyst comprises vanadium compounds selected from the group consisting of oxides, halides, and oxyhalides of vanadium and complex salts of halides of vanadium with a member selected from the group consisting of ammonium halide and an alkali metal halide, including sodium, potassium, lithium, rubidium, and cesium halides, where the term "halide" includes chloride, fluoride, bromide and iodide. Example of such vanadium compounds falling within the scope of this defined class are vanadium tetrachloride, vanadium pentoxide, vanadium dioxide, vanadium sesquioxide, vanadium monooxide, vanadium trifluoride, vanadium trichloride, vanadium tetrafluoride, vanadium tribromide, vanadium triiodide, vanadium oxydifluoride, vanadium oxytrichloride, vanadium oxydibromide, potassium tetrachlorovanadite ($KVCl_4$) and ammonium pentachloro-vanadite (($NH_4$)$_2VCl_5$). It is preferred to employ the compounds in the anhydrous or substantially anhydrous form. In some instances, it is desirable to heat the compounds to convert the hydrated form to the anhydrous form prior to use in the catalyst system of the invention. (Vanadium tetrachloride and vanadium pentoxide are now preferred.)

Still another class of compounds useful as co-catalysts in my invention is molybdenum compounds selected from the oxides of molybdenum and the alkali metal and ammonium molybdates, including sodium, potassium, lithium, rubidium, and cesium molybdates. Examples of such compounds of molybdenum are molybdenum sesquioxide, sodium molybdate, molybdenum dioxide, molybdenum trioxide, molybdenum pentoxide, sodium dimolybdate, sodium tetramolybdate, sodium decamolybdate, sodium permolybdate, ammonium molybdate, potassium molybdate, lithium molybdate, and potassium dimolybdate. I now prefer molybdenum sesquioxide and sodium molybdate, which are particularly useful as co-catalysts with my fulvene catalyst. It is preferred to employ the molybdenum catalysts of my invention in anhydrous or substantially anhydrous form. Some of the molybdates are more readily obtained as the hydrates, and these are preferably treated to drive off the water of hydration and form substantially anhydrous molybdates prior to use as a catalyst.

Also applicable as a co-catalyst of the invention is at least one of a class of group IV–A metallo-organic compounds, which class consists of (1) a group IV–A metal salt of a monobasic organic acid wherein the acid group contains not more than 20 carbon atoms, (2) a complex salt of a group IV–A metal and at least one of an alkali metal and ammonia and a di-basic organic acid wherein the acid radical contains not more than 20 carbon atoms, (3) a complex compound of a group IV–A metal corresponding to the formula $X_nD(OL)_m k$ and (4) complex compounds of a group IV–A metal corresponding to the formula $D_a[(OCH_2CH_2)NH_{(3-a)}]_b$, wherein X is a halogen, wherein D is a metal selected from the group consisting of titanium, zirconium, hafnium and thorium, wherein L is selected from the group consisting of L″ and L‴, where L″ is selected from the group consisting of saturated acyclic (alkyl), monoolefinic acyclic (alkenyl), saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, arylalkenyl, cycloalkylalkenyl, cycloalkylalkyl, alkenylaryl, and alkenylcycloalkyl. L‴ is selected from the group consisting of (a) L″ radicals which are halogen substituted, (b) L″ radicals which contain oxygen, and (c) L″ radicals which are halogen substituted and contain oxygen, said oxygen being present in the form of an ether linkage, wherein $m$ and $n$ are whole numbers, $m$ is an integer and is at least 1 and not greater than the valence of the metal D and with the sum of $m$ and $n$ being equal to the valence of D, and wherein $a$ is an integer from 1 to 3, inclusive, and $b$ is equal to the valence of D. Each L contains not more than 20 carbon atoms, preferably less than 10 carbon atoms, with the total number of carbon atoms in the complex compound not exceeding 50. The expression "group IV–A metal" as used herein is intended to include titanium, zirconium, hafnium, and thorium. X and the halogen contained in the L radical can be any of the halogens, including bromine, chlorine, fluorine, and iodine. Mixtures of any two or more of these derivatives can be used in the practice of my invention. Salts of monobasic organic acids and a group IV–A metal which can be used include such compounds as titanium acetate, zirconium propionate, titanium butyrate, and the like. Complex salts of dibasic organic acids and at least one group IV–A metal and at least one of the group consisting of alkali metals and ammonia can also be advantageously employed in my catalyst system. Examples of such compounds are sodium titanium malonate $$(Na_2TiO(C_3H_2O_4)_2)$$

potassium titanium oxalate (the complex salt of oxalic acid and titanium and potassium $(K_2TiO(C_2O_4)_2)$), and the like. Of the latter group of compounds, potassium titanium oxalate is the compound which is preferred for use in the catalyst system of my invention. Although numerous derivatives fall within the scope of the class of complex compounds corresponding to the formula $$X_nD(OL)_m$$

the preferred derivatives include titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra-(chloroethyl) titanate, tetra-m-tolyl titanate, tetraallyl titanate, tetracyclohexenyl titanate, tetracyclopentyl titanate, tetraethyl zirconate, tetramethyl zirconae, tetraisopropyl zirconate, tetraamyl zirconate, dichloro diethyl titanate $(Cl_2Ti(OC_2H_5)_2)$, monochloro triethyl titanate $(ClTi(OC_2H_5)_3)$, and dichloro diethyl zirconate $$(Cl_2Zr(OC_2H_5)_2)$$

Also included are such compounds as $Hf(OCH_3)_4$, $$Th(OC_3H_7)_4, Th(OC_6H_5)_4, Cl_3Ti(OC_6H_4CH_3),$$
$$Zr(OC_4H_7)_4, Cl_2Hf(OC_{10}H_{21})_2, Th(OC_6H_{13})_4,$$

and $Zr(OC_{12}H_{25})_4$. Of the complex compounds listed in the above group, titanium butoxide $(Ti(OC_4H_9)_4)$ is preferred for use with my alkali-metal-fulvene catalyst. Examples of complex compounds corresponding to the formula $D_a[(OCH_2CH_2)_aNH_{(3-a)}]_b$ which can be employed in my catalyst system include monoethanolamine titanate, diethanolamine titanate, triethanolamine titanate, monoethanolamine zirconate, diethanolamine zirconate, triethanolamine zirconate, monoethanolamine thoriate, and the like. Of this latter group of compounds, it is preferred to use triethanolamine titanate in the catalyst system of my invention. The group IV–A metal derivatives listed hereinabove are preferably employed in the anhydrous or substantially anhydrous form.

Another class of metal compounds which can be employed in conjunction with the novel fulvene compound catalyst of the invention include the iridium, osmium and platinum halides, oxides and complex compounds of the formula $M''_xM'''X_y$, wherein $M''$ is selected from alkali metal radicals, including sodium, potassium, lithium, rubidium, and cesium radicals and the ammonium radical, $M'''$ is a metal selected from osmium, iridium and platinum, X is a halogen, $x$ and $y$ are integers, and $y$ is at least 1 and the sum of $x$ and $y$ is equal to the valence of $M'''$. X can be any of the halogens, i.e., bromine, chlorine, fluorine, and iodine. Any of the halides of iridium, platinum, and osmium, including the florides, chlorides, bromides, and iodides and any of the oxides of iridium, platinum, and osmium can be employed. Specific examples of such compounds include iridium tetrachloride, platinum tetrachloride, osmium tetrachloride, iridium hexafluoride, iridium tetrabromide, iridium tetraiodide, platinum tetrafluoride, platinum tetraiodide, platinum dibromide, platinum tetrabromide, osmium tetrafluoride, osmium dichloride, osmium trichloride, iridium sesquioxide, iridium dioxide, platinum dioxide, platinum monoxide, osmium dioxide, osmium sesquioxide, potassium chloroiridate $$(K_2IrCl_6)$$

sodium bromoiridite $(Na_3IrBr_6)$, potassium iodoiridite $(K_3IrI_6)$, ammonium iodoiridate $((NH_4)_2IrI_6)$, rubidium chloroplatinate $(Rb_2PtCl_6)$, lithium chloro platinate $$(Li_2PtCl_6)$$

potassium chloroplatinate $(K_2PtCl_4)$, ammonium iodoplatinate $((NH_4)_2PtI_6)$, potassium chloroplatinate $$(K_2PtCl_6)$$

potassium chloroosmate $(K_2OsCl_6)$, ammonium chloroosmate $((NH_4)_2OsCl_6)$, sodium chloroosmate $$(Na_2OsCl_6)$$

potassium chloroosmate $(K_3OsCl_6)$, and other compounds of similar structure. The aforementioned compounds together with their physical properties and method of preparation are described in the literature. Of the compounds listed, the iridium and platinum chlorides and fluorides are the compounds which are preferred for use with my fulvene catalyst. While the osmium compounds can be employed with my novel fulvene catalyst, suitable precautions must be observed since many of these compounds are known to be toxic to human beings. Iridium, platinum and osmium compounds are preferably employed in the anhydrous or substantially anhydrous form.

Another class of co-catalysts which can be employed with the alkali metal-fulvene catalyst of the invention consists of complex metal halides of group IV–A metals having the formula QQ'X, wherein Q is one of an alkali metal and ammonium radical, Q' is a metal of group IV–A, i.e., titanium, zirconium, hafnium and thorium, and X is fluorine or chlorine. In general, these compounds are relatively high melting solids, and it is believed that they are complex metal halide salts. Any of the known or available complex salts, including potassium fluotitanate $(K_2TiF_6)$, potassium fluozirconate $(K_2ZrF_6)$, lithium fluotitanate $(Li_2TiF_6)$, potassium chlorozirconate $(K_2ZrCl_6)$, cesium fluozirconate $(Cs_2ZrF_6)$, ammonium chlorotitanate $((NH_4)_2TiCl_6)$, potassium fluothoriate $(K_2ThF_6)$, and potassium fluohafniate $(K_2HfF_6)$, can be employed in my process. The complex metal halides which are preferably used in the catalyst composition of this invention are potassium fluotitanate and potassium fluozirconate.

As a third component of the mixed catalyst which includes the novel fulvene compound catalyst of the invention, there can also be employed aluminum chloride. Specific mixed catalysts applicable according to the invention include the following:

(1) 6,6-di(sodiummethyl)fulvene plus titanium trichloride or titanium tetrachloride.
(2) 2,3,6,6-tetra(sodiummethyl)fulvene plus titanium butoxide.
(3) 1,2-di(sodiummethyl)-6,6-di(αsodiummethyl)fulvene plus $K_2TiO(C_2O_4)_2$.
(4) 8,8-di(potassiummethyl)benzofulvene plus aluminum chloride and titanium butoxide.
(5) 6,6-di(sodiummethyl)dibenzofulvene plus zirconium tetrachloride.
(6) 6,6-di(lithiummethyl)-2,3-dipropylfulvene plus sodium molybdate.
(7) 6,6-di(potassiumphenyl)fulvene plus vanadium oxymonochloride.
(8) 6,6-di(sodiummethyl)fulvene plus molybdenum oxybromide.
(9) 2,3,6,6-tetra(sodiummethyl)fulvene plus chromyl chloride.
(10) 1,2 - di(sodiummethyl) - 6,6 - di(αsodiummethyl) fulvene plus $K_2TiCl_6$.
(11) 8,8-di(potassiummethyl)benzofulvene plus vanadium oxytrichloride.
(12) 6,6-di(sodiummethyl)dibenzofulvene plus titanium hydride, with or without aluminum chloride.
(13) 6,6 - di(lithiummethyl) - 2,3 - dipropylfulvene plus molybdenum pentachloride.
(14) 6,6-di(potassiumphenyl)fulvene plus potassium fluotitanate.
(15) 6,6-di(sodiummethyl)fulvene plus a mixture of an oxide of molybdenum and an alkali metal molybdate or ammonium molybdate.

(16) 2,3,6,6-tetra(sodiummethyl)fulvene plus iridium chloride.

(17) 1,2 - di(sodiummethyl) - 6,6 - di(αsodiummethyl) fulvene plus vanadium oxide.

(18) 8,8-di(potassiummethyl)benzofulvene plus tetrabutylzirconate and aluminum chloride.

The catalytic polymerization method of the invention is applicable broadly to the polymerization of polymerizable organic monomers containing an ethylenic double bond. The invention is especially applicable to polymerizable hydrocarbons containing an ethylenic double bond, e.g., olefins and diolefins. Of the olefinic hydrocarbons, those most generally preferred are the 1-olefins containing from 2 to 8 carbon atoms per molecule. In particular, ethylene is found to polymerize to a polymer upon being contacted with a catalyst of the invention at lower temperatures and pressures than have been employed in processes of the prior art previously mentioned. Examples of other polymerizable hydrocarbons which can be employed in the process of this invention are propylene, 1-butene, 1-hexene, and 1-octene. Branched chain olefins can also be used, such as isobutylene, as well as 1,1-dialkyl-substituted and 1,2-dialkyl-substituted ethylenes. Examples of di- and polyolefins in which the double bonds are in non-conjugated positions, and which can be employed in accordance with this invention are 1,5-hexadiene, 1,4-pentadiene and 1,4,7-octatriene. Mixtures of the foregoing polymerizable hydrocarbons can be polymerized to a solid polymer employing a catalyst of the invention as, for example, by copolymerizing ethylene and propylene, ethylene and 1-butene, propylene and 1-butene, or propylene and a pentene. Also, aryl olefins, e.g., styrene and alkyl-substituted styrene can be polymerized to a solid polymer according to the process of this invention.

Examples of a monomeric material comprising a conjugated diene containing from 4 to 8 or more carbon atoms which can be polymerized according to the process of this invention include 1,3-butadiene, isoprene, 2,3-dimethylbutadiene, 2-methoxybutadiene, 2-phenylbutadiene, and the like. It is also within the scope of the invention to polymerize such conjugated dienes either alone or in admixture with each other and/or with one or more compounds containing an active $CH_2=C<$ group which are copolymerizable therewith. Examples of monoolefins of this description are listed above. Examples of other compounds containing the active $CH_2=C<$ group include styrene, acrylonitrile, methyl acrylate, methyl methacrylate, vinyl chloride, 2-methyl-5-vinylpyridine, 2-vinylpyridine, etc.

The temperature at which the polymerization according to the invention is carried out can vary over a rather broad range, usually from −100° F. to 500° F., more generally from 100 to 350° F. Although pressures ranging from atmospheric up to 30,000 p.s.i.g. or higher can be employed, a pressure in the range from atmospheric to 1,000 p.s.i.g. is usually sufficient.

It is preferred to carry out the reaction in the presence of an inert, organic diluent, preferably a hydrocarbon, with a pressure sufficient to maintain the diluent in the liquid phase, giving rise to a so-called mixed-phase system. However, the polymerization of the invention proceeds in the gaseous phase without a diluent. Employing the temperature and pressure conditions set forth above, the polymerization process of my invention produces polymers having a molecular weight in excess of 1,000 and on up to several thousand, depending upon the specific catalyst, temperature, pressure and other conditions, in excess of 20,000 being usual.

Suitable diluents for use in the polymerization process are paraffins, halogenated paraffins, cycloparaffins, and/or aromatic hydrocarbons which are relatively inert, non-deleterious and liquid under the conditions of the process. The lower molecular weight alkanes, such as propane, butane, and pentane can be employed as well as the higher molecular weight paraffins and cycloparaffins, such as isooctane, cyclohexane and methylcyclohexane. Halogenated aromatics such as chlorobenzene, and aromatic diluents can also be employed such as benzene, toluene, and the like, particularly when operating at higher temperatures. Mixtures of any two or more of these diluents can also be employed.

The process of this invention can be carried out as a batch process by pressuring the olefin into a reactor containing the catalyst and diluent, if the latter is used. Also, the process can be carried out continuously by maintaining the before-described concentrations of reactants in the reactor for a suitable residence time. The residence time used in a continuous process can vary widely, since it depends upon the temperature at which the process is carried out to a great extent. The residence time also varies with the specific monomer that is polymerized. However, the residence time for the polymerization of aliphatic monoolefins, within the temperature range of 100 to 350° F., falls within the range of one second to about an hour. In a batch process, the time for the reaction can vary widely, from as little as the order of one minute to as long as the order of 24 hours.

Various materials can to some extent affect the activity or effectiveness of the catalyst composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any known means for removing such contaminants can be employed. When a diluent is used in the process, this material is usually freed of such contaminants. It is desirable, also, that air and moisture be removed from the reaction vessel before the reaction is carried out.

At the completion of the polymerization reaction, the catalyst is killed or inactivated by any suitable means, such as by contact with water or with an alcohol, and the solid olefin polymer is separated from the diluent, washed with a suitable material and finally dried. If desired, the product can be comminuted in a suitable grinder or the like during the purification and/or washing steps.

When one or more co-catalysts are employed according to the invention, there is usually employed from 0.5 to 2 parts of co-catalyst per part of the fulvene derivative catalysts of the invention, and total combined catalysts usually do not exceed 5 weight per cent of the monomers charged.

The solid polymers produced according to the invention are useful for making molded articles, such as bowls, pails, conduits, etc. Further, the rubbery polymers can be vulcanized and used in making shoe soles, belting, tires, etc.

*Example I*

Ethylene is polymerized in the presence of 600 parts by weight of cyclohexane as a diluent and 3 parts by weight of 6,6-di(sodiummethyl)fulvene as catalyst per 100 parts by weight of the total ethylene charge. The reaction vessel is stainless steel pressure vessel. Initially, one-fourth of the total ethylene is charged to the reaction vessel and the remainder is charged thereto in increments during the reaction period. The total catalyst and diluent are initially charged to the reaction vessel. During the reaction, the temperature is maintained in the range from 150 to 250° F., and the pressure is maintained between 200 and 1000 p.s.i.g. After substantial completion of the reaction as indicated by a lowering of the ethylene pressure in the vessel, residual ethylene is vented from the vessel and a solid polymer of ethylene is recovered from the reaction mixture by pouring the same into a vessel of hot water, and then separating the polymer from the water phase and thereafter drying the polymer.

*Example II*

1,3-butadiene is polymerized in a twelve-ounce beverage bottle according to the following recipe:

Ingredient: Parts by weight
Butadiene _____ 100
Benzene _____ 440
Catalyst _____ 0.5
Temperature, ° C. _____ 50

The catalyst employed is 6,6-di(potassiumphenyl)fulvene. The benzene solvent is predried. Prepurified nitrogen is dispersed through a fritted glass tube and bubbled through the solvent for several minutes. All of the materials are added to the beverage bottle before capping with rubber gaskets and metal caps, the catalyst being introduced just before capping. The bottle is agitated in a constant temperature bath during the polymerization reaction period. After the completion of the polymerization a benzene solution containing about 5 percent by weight isopropyl alcohol and about 2 percent by weight phenyl-beta-naphthylamine is added. The amine is added to serve as an anti-oxidant. The rubbery polymer is then precipitated by adding an excess of isopropyl alcohol, the polymer separated, and then the polymer is dried in a vacuum oven.

*Example III*

Example II is repeated except that the catalyst is 2,3,6,6-tetra-(sodiummethyl)fulvene. A rubbery polymer is produced.

*Example IV*

Example II is repeated except that one-fourth of the weight of 1,3-butadiene is replaced by styrene and the catalyst used in Example II is replaced by the complex sodium-fulvene type compound having the formula

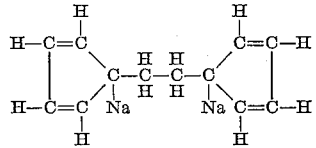

A rubbery copolymer of butadiene and styrene is produced.

*Example V*

Example II is repeated except that the 1,3-butadiene is replaced by isoprene and the catalyst is replaced by 1.5 parts by weight of 8,8-di(potassiummethyl)benzofulvene. The polymer produced is rubbery in nature.

*Example VI*

A copolymer of ethylene and propylene is prepared in a stainless steel autoclave equipped with an agitator. Before charging the reactor, it is flushed with prepurified nitrogen to remove oxygen, water vapor, and other possible catalysts poisons. The catalyst components and solvent are then added to the reactor. At this point, the reaction vessel is pressured with ethylene to about 50 p.s.i.g. and the ethylene then vented to the atmosphere. This procedure is repeated three times in order to flush the vapor space of any contaminating materials. The agitator is then started and the reactor is pressured with a mixture of ethylene and propylene in a ratio of 3 parts by weight of ethylene to 1 part by weight of propylene. The olefin feed mixture is passed through a purification system prior to charging to the reactor, first through a pyrogallol solution, a sodium hydroxide solution, and then drying agents to remove oxygen, carbon dioxide, and water vapor.

In this example, 25 parts by weight of the olefin mixture is initially charged to the reactor, the remaining 75 parts being added during the reaction period. The catalyst consists of 2 parts by weight of the substituted fulvene compound having the formula

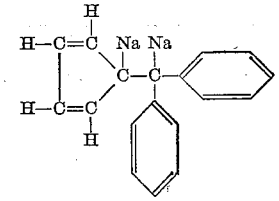

As the solvent, 300 parts by weight of cyclohexane (distilled from sodium) is employed. The catalyst is dissolved in this solvent, and this mixture is charged to the reactor before charging the initial quantity of olefin monomers, as before stated. After the initial portion of the ethylene is charged, the temperature soon rises to about 150° F., and the temperature is held in the range from 150 to 175° F. during the ensuing polymerization. The remaining monomers are charged incrementally during the period of polymerization. After the polymerization is substantially completed, as indicated by the pressure, the reaction is stopped and residual monomers vented from the reactor. A solid copolymer of ethylene and propylene is produced, and is ground in a Waring Blendor with approximately 700 parts of methyl alcohol to destroy any remaining catalyst. The finely divided polymer is filtered from the alcohol and is then dried in a vacuum oven. The solid polymer is theremoplastic in nature.

*Example VII*

The reaction of Example VI is repeated except that the catalyst is replaced by the substituted fulvene compound having the formula

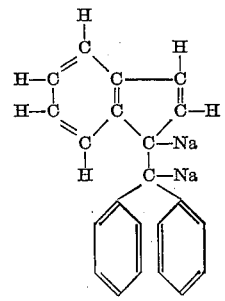

and the monomer is entirely ethylene. The product produced is a solid polyethylene.

*Example VIII*

Example VI is repeated except that the monomers consist of a mixture of styrene and isobutylene in the ratio of 3 parts by weight of styrene to 1 part by weight of isobutylene and the catalyst is replaced by 3 parts by weight of 6,6-di(sodiummethyl)dibenzofulvene and the flushing of the reactor is effected employing isobutylene instead of ethylene. The solid polymer produced is a fairly hard thermoplastic copolymer of styrene and isobutylene.

*Example IX*

The reaction of Example VII is repeated in two runs except that the catalyst is replaced in one run with 1,2-di(sodiummethyl)-6,6-di(α-sodiummethyl)fulvene, and in the other run the catalyst is replaced with 6,6-di(potassiumphenyl)fulvene. In each run, a thermoplastic solid polymer of ethylene is produced.

*Example X*

Styrene is polymerized at asmospheric pressure in a round bottom flask equipped with a stirrer. The reaction is carried out in a nitrogen atmosphere maintained during the charging procedure and also during polymerization. The recipe for the reaction is as follows:

| | Parts by weight |
|---|---|
| Styrene | 100 |
| Benzene | 180 |
| Vanadium tetrachloride | 1.8 |
| 6,6-di(sodiummethyl)dibenzofulvene | 3 |

After the addition of the benzene, the vanadium tetrachloride and 6,6-di(sodiummethyl)dibenzofulvene catalysts are charged to the flask, while stirring the reactor contents. The styrene is freshly distilled and is then added dropwise to the benzene solution of the catalysts and an exothermic reaction occurs. After addition of all of the styrene, the mixture is allowed to reflux for several hours. At the end of this refluxing period, 15 parts by weight of methyl alcohol is added with stirring in order to inactivate the catalyst. The solution is then filtered while hot and the filtrate added to about 2,000 parts by weight of methyl alcohol to recover the polymer. The polystyrene formed precipitates and is separated by decanting off the liquid phase. The polymer is dried in a vacuum oven and then allowed to cool. The polymer is a brittle, thermoplastic solid.

*Example XI*

In a number of runs 1,3-butadiene is polymerized employing various catalyst systems according to the invention. These runs are carried out by the following procedure.

Benzene is charged to a 1-quart beverage bottle, after which the catalyst is charged to the bottle. Then the bottle is placed in an ice bath so as to freeze the contents of the bottle. The 1,3-butadiene is then charged to the bottle. During the charging of the catalyst components and the butadiene, the vapor space in the bottle is continuously flushed with nitrogen. After these materials are charged, the bottle is sealed with a neoprene seal and a crown bottle cap. The bottle is then placed in a 30° C. constant temperature bath and tumbled in this bath for three hours. At the end of this time the contents of the bottle is of a viscous nature. The bottle is opened and its contents are dumped into a large quantity of isopropyl alcohol, and the resulting mixture is vigorously stirred. The polymer precipitates and is removed and dried in a vacuum oven. In each of the runs a solid, rubbery polymer is obtained.

In each of the runs, the following recipe is employed:

| | Parts by weight |
|---|---|
| Butadiene | 100 |
| Benzene | 440 |
| Catalyst | 2.7 |

Different catalyst combinations are employed in the respective bottles, as follows: 1.3 parts by weight titanium tetrachloride plus 1.4 parts by weight 6,6-di(sodiummethyl)fulvene; 1.3 parts by weight titanium tetraiodide plus 1.4 parts by weight 2,3,6,6-tetra(sodiummethyl)fulvene; 1.3 parts by weight titanium trichloride plus 1.4 parts by weight 1,2-di(sodiummethyl)-6,6-di(α-sodiummethyl)fulvene; 1.3 parts by weight titanium dichloride plus 1.4 parts by weight 8,8-di(potassiummethyl)benzofulvene.

*Example XII*

Ethylene is polymerized under pressure in a stainless steel rocking autoclave in the presence of a catalyst consisting of 1.7 parts by weight of tetrabutyl titanate plus 2 parts by weight of 6,6-di(potassiumphenyl)fulvene per 100 parts by weight of ethylene charged and employing 300 parts by weight of cyclohexane as the solvent. The reactor is flushed with dry nitrogen prior to and during the charging procedure to prevent contact of the catalyst with air or moisture. The ethylene is passed through a purification system to remove oxygen, carbon dioxide and water vapor prior to entering the reactor. The purification system comprises a pyrogallol solution, a sodium hydroxide solution and drying agents. The cyclohexane is first charged to the reactor, followed by the catalytic materials. Ethylene is added to the reactor containing the catalyst and cyclohexane until a pressure of about 200 p.s.i.g. is reached. The reactor is then heated to about 390° F. and maintained at that temperature during the reaction, while the remaining portion of the 100 parts of ethylene is added in increments during the reaction. After the reaction is substantially complete as indicated by the pressure drop, the reactor is opened and the resulting solid polymer of ethylene is removed and is stirred for a period of time with about 400 parts by weight of isopropyl alcohol, and then filtered to recover the solid polymer, after which the polymer is dried in a vacuum oven.

*Example XIII*

Example XII is repeated except that the catalytic materials are replaced by 2 parts by weight of potassium titanium oxalate ($K_2TiO(C_2O_4)_2$) plus 1.5 parts by weight of 6,6-di(lithiummethyl)-2,3-dipropylfulvene. The resulting polymer is a thermoplastic, solid polymer of ethylene.

*Example XIV*

Example XII is repeated except that the catalyst is replaced by 1.7 parts by weight of titanium tetrachloride plus 1 part by weight of 6,6-di(sodiummethyl)fulvene. The polymer produced is a solid polymer of ethylene.

*Example XV*

Example XII is repeated except that the catalyst components are replaced by 2 parts by weight of potassium fluotitanate ($K_2TiF_6$), plus 1 part by weight of 2,3,6,6-tetra(sodiummethyl)fulvene, and the 100 parts by weight of ethylene are replaced by 100 parts by weight of propylene. A solid product of propylene is recovered from the reactor, thermoplastic in nature.

*Example XVI*

Example XII is repeated except that the catalytic materials are replaced by 1 part of titanium hydride ($TiH_2$) plus 2 parts by weight of aluminum chloride and one part by weight of 6,6-di(lithiummethyl)dibenzofulvene. A solid, thermoplastic polymer of ethylene is produced.

*Example XVII*

Example XVI is repeated except that the 1 part by weight of titanium hydride is replaced by 1 part by weight of titanium oxide.

*Example XVIII*

Example XII is repeated except that the catalytic materials are replaced by 2 parts by weight of chromyl chloride plus 1 part by weight of 6,6-di(potassiummethyl)fulvene. A solid polymer of ethylene is produced.

*Example XIX*

Example XVIII is repeated except that the chromyl chloride is replaced by the same weight of sodium molybdate. The polyethylene produced is a solid thermoplastic.

*Example XX*

Example XVIII is repeated except that the chromyl chloride is replaced by the same amount of zirconium tetraiodide. A solid polymer of ethylene is produced.

*Example XXI*

The procedure of Example XVIII is repeated except that the chromyl chloride is replaced by the same amount of molybdenum tetrachloride. The ethylene polymer produced is a solid thermoplastic material.

As will be evident to those skilled in the art, various modifications of this invention can be made or followed in the light of the foregoing disclosure and discussion

I claim:

1. A method of polymerizing a polymerizable compound containing an ethylenic double bond by contacting said polymerizable compound with a catalytic amount of a substituted fulvene compound containing at least two alkali metal atoms selected from the group consisting of (1) 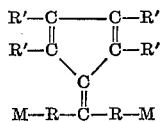

(2) 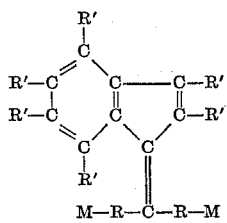

(3) 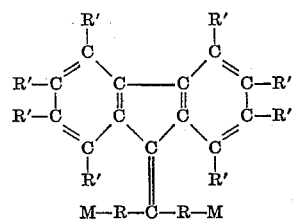

(4) 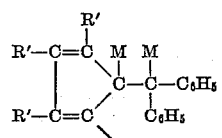

(5) 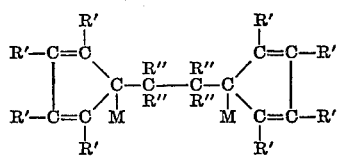

(6) 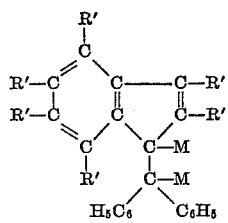

wherein R is a divalent hydrocarbon radical selected from the group consisting of an alkylene, a cycloalkylene and an arylene radical; R' is a radical selected from the group consisting of hydrogen, alkyl, aryl, alkaryl, aralkyl and cycloalkyl hydrocarbon radicals, an alkali metal radical, and a radical MR; and R" is a radical selected from the group consisting of a hydrogen and a methyl radical, M is an alkali metal radical, and wherein each of R and R' contain a maximum of 10 carbon atoms.

2. A polymerization according to claim 1 wherein said polymerizable compound is a 1-olefin containing from 2 to 8 carbon atoms per molecule.

3. A polymerization of claim 1 wherein said polymerizable compound is a conjugated diene.

4. A method of polymerizing ethylene by contacting said ethylene with from 0.05 to 5 weight percent of 6,6-di(sodiummethyl)fulvene based on the ethylene charged.

5. A method according to claim 1 wherein said substituted fulvene compound is 2,3,6,6-tetra(sodiummethyl)fulvene.

6. A method according to claim 1 wherein said substituted fulvene compound is 1,2-di(sodiummethyl)-6,6-di(αsodiummethyl)fulvene.

7. A method according to claim 1 wherein said substituted fulvene compound is 8,8-di(potassiummethyl)benzofulvene.

8. A method according to claim 1 wherein said substituted fulvene compound is 6,6-di(sodiummethyl)dibenzofulvene.

9. A method according to claim 1 wherein said substituted fulvene compound is 6,6-di(lithiummethyl)-2,3-dipropylfulvene.

10. A method according to claim 1 wherein said substituted fulvene compound is 6,6-di(potassiumphenyl)fulvene.

11. A method according to claim 1 wherein said substituted fulvene compound is

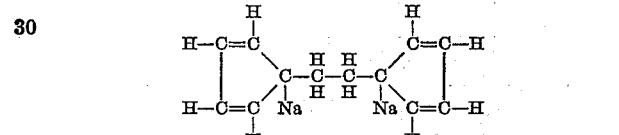

12. A method according to claim 1 wherein said substituted fulvene compound is

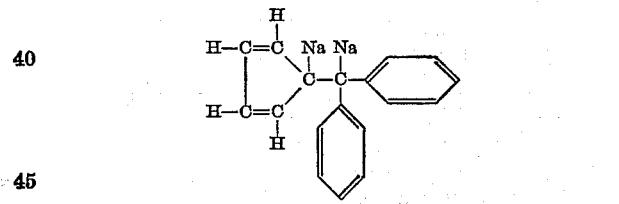

13. A method according to claim 1 wherein said substituted fulvene compound is

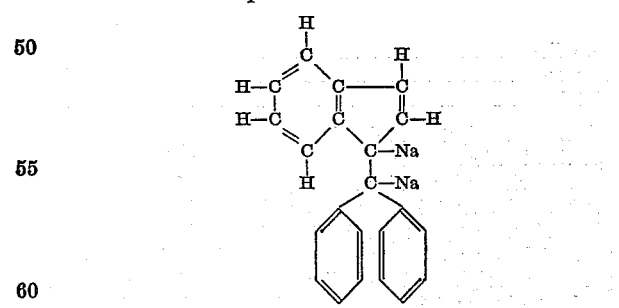

References Cited in the file of this patent

UNITED STATES PATENTS

| | | |
|---|---|---|
| 2,563,074 | Schmerling | Aug. 7, 1951 |
| 2,827,446 | Breslow | Mar. 18, 1958 |